United States Patent [19]

Pfaendner et al.

[11] Patent Number: 5,270,435
[45] Date of Patent: Dec. 14, 1993

[54] POLYARYLENE ETHERS

[75] Inventors: Rudolf Pfaendner, Rimbach/Odenwald; Thomas Kainmüller, Lindenfels/Odenwald; Kurt Hoffmann, Lautertal, all of Fed. Rep. of Germany; Andreas Kramer, Duedingen; Friedrich Stockinger, Courtepin, both of Switzerland

[73] Assignee: Ciba-Geigy Corporation, Ardsley, N.Y.

[21] Appl. No.: 816,839

[22] Filed: Jan. 9, 1992

Related U.S. Application Data

[63] Continuation of Ser. No. 537,197, Jun. 12, 1990, abandoned.

[30] Foreign Application Priority Data

Jun. 23, 1989 [CH] Switzerland ........................ 2343/89
Mar. 23, 1990 [CH] Switzerland ........................ 964/90

[51] Int. Cl.$^5$ ..................... C08G 75/00; C08G 65/38
[52] U.S. Cl. .................................. 528/171; 528/125; 528/174; 528/219
[58] Field of Search ............... 528/125, 171, 174, 219; 428/411.1; 524/611

[56] References Cited

U.S. PATENT DOCUMENTS

| | | | |
|---|---|---|---|
| 3,264,536 | 8/1966 | Robinson et al. | 528/174 |
| 3,524,833 | 8/1970 | Darms | 260/47 |
| 3,875,103 | 4/1975 | Leslie | |
| 4,730,018 | 3/1988 | Rabeson | 524/360 |

FOREIGN PATENT DOCUMENTS

| | | |
|---|---|---|
| 0184458 | 6/1986 | European Pat. Off. |
| 322151 | 6/1989 | European Pat. Off. |
| 62148523 | 7/1987 | Japan |

OTHER PUBLICATIONS

Derwent Abst. 87-224374.
J. of Polymer Science, Part a-1, vol. 5, pp. 2374-2398 (1967).

*Primary Examiner*—John Kight, III
*Assistant Examiner*—T. Mosley
*Attorney, Agent, or Firm*—William A. Teoli, Jr.

[57] ABSTRACT

Polyarylene ethers which, based on the total amount of the structural units present in the polyether resin, contain 2-100 mol % of a recurring structural unit of formula I

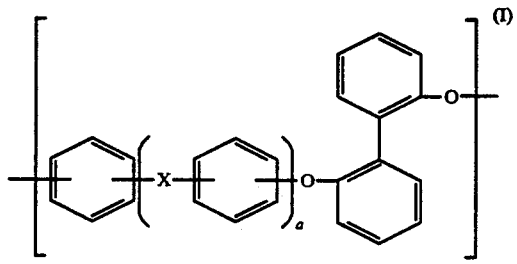

and 0-98 mol % of a recurring structural unit of formula II

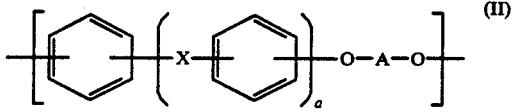

wherein each a is 1 or 2, 10 to 100% of X, based on the total number of the bonds X present in the structural units of formulae I and II, are —SO$_2$—, and 0 to 90% of X are —CO—, and A is a group of formula IIIa–IIIg:

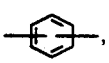

(IIIa)

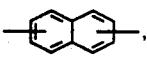

(IIIb)

(Abstract continued on next page.)

-continued

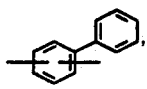 (IIIc)

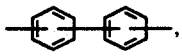 (IIId)

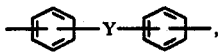 (IIIe)

 or (IIIf)

-continued

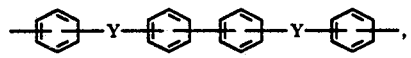 (IIIg)

wherein Y is —CH$_2$—, —C(CH$_3$)$_2$—, —C(CF$_3$)$_2$—, —S—, —SO—, —SO$_2$—, —O— or —CO—, and the aromatic rings in the structural units of formulae I and II are unsubstituted or substituted by one or more alkyl groups of 1 to 4 carbon atoms, have good solubility in organic solvents and are suitable preferably for modifying other plastics materials or for use as matrix resins for the production of fibrous composite structures.

10 Claims, No Drawings

POLYARYLENE ETHERS

This application is a continuation, of application Ser. No. 537,197, filed Jun. 12, 1990, now abandoned.

The present invention relates to novel polyarylene ethers derived from 2,2'-dihydroxybiphenyl, to the preparation thereof and to the mouldings, coatings, sheets or fibrous composite structures made therefrom.

Polyarylene ether sulfones and ketones are known and some are commercially available, for example under the registered trademarks Victrex® PEEK and Victrex® PES supplied by ICI or Ultrason® E and Ultrason® S supplied by BASF. They are industrial materials having very good mechanical properties and excellent resistance to organic solvents. Such polyarylene ethers are also derived from 4,4'-dihydroxybiphenyl. However, polyarylene ether ketones derived from 4,4'-dihydroxybiphenyl are not soluble in organic solvents, as may be inferred from European patent application 0 184 458. Polyarylene ether sulfones derived from 4,4'-dihydroxybiphenyl are only soluble in strongly polar solvents such as N-methylpyrrolidone, but not in chlorinated hydrocarbons such as methylene chloride, as reported by R. N. Johnson et al. in the Journal of Polymer Science, Part A-1, 1967, Vol. 5, 2375-2398. For many utilities, such solubility properties are undesirable. Films, for example, are conveniently prepared from the solution, or substantially concentrated polymer solutions in customary organic solvents will be used for the modification of duromer matrix resins.

In U.S. patent specification 3,875,103 it is said that polyether sulfones form unstable solutions in chlorinated hydrocarbons. To obviate this shortcoming, a special solvent mixture of cyclohexanone, dimethyl sulfoxide and methyl ethyl ketone is used for the preparation of polyether sulfone solutions.

Further, a novel process for the preparation of polyether ketones is disclosed in Japanese patent Kokai 62-148 523. The recitation of eligible dihydroxybiphenyls also mentions 2,2'-dihydroxybiphenyl, but no specific Example is given for the preparation of a polyether ketone from this compound. In all preparatory Examples of this patent application, the films are prepared by compression moulding at 450° C.

Surprisingly, it has now been found that polyarylene ether sulfones and copolymers of polyarylene ether sulfones and polyarylene ether ketones derived from 2,2'-dihydroxybiphenyl have very good solubility in chlorinated hydrocarbons such as methylene chloride, and form stable solutions in these solvents.

Accordingly, the present invention relates to novel polyarylene ethers having a reduced viscosity of 0.1 to 2.0 dl/g, measured at 25° C. in a 1% solution in N-methylpyrrolidone, which ethers, based on the total amount of the structural units present in the polyether resin, contain 2-100 mol % of a recurring structural unit of formula I

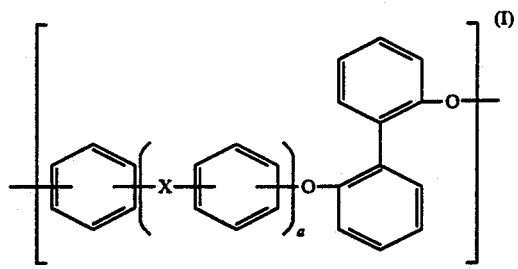

and 0-98 mol % of a recurring structural unit of formula II

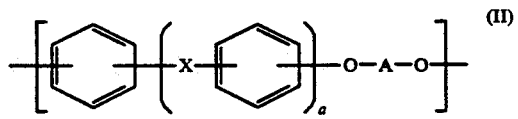

wherein each a is 1 or 2, 10 to 100% of X, based on the total number of the bonds X present in the structural units of formulae I and II, are —SO$_2$—, and 0 to 90% of X are —CO—, and A is a group of formula IIIa–IIIg

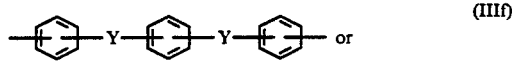

wherein Y is —CH$_2$—, —C(CH$_3$)$_2$—, —C(CF$_3$)$_2$—, —S—, —SO—, —SO$_2$—, —O— oder —CO—, and the aromatic rings in the structural units of formulae I and II are unsubstituted or substituted by one or more alkyl groups of 1 to 4 carbon atoms.

Preferred polyarylene ethers of this invention are those having a reduced viscosity of 0.15 to 1.8 dl/g, preferably of 0.2 to 1.2 dl/g.

It is common knowledge that the reduced viscosity is a means for determining the molecular weight of polymers. The indicated values of the reduced viscosity of 0.1 to 2.0 dl/g corresponds to an average molecular weight in the range from 1000 to 100,000.

Preferably the polyarylene ethers contain 5–100 mol %, most preferably 10–100 mol %, of a recurring structural unit of formula I, and 95–0 mol %, most preferably 90–0 mol %, of a recurring structural unit of formula II.

Preferably 25 to 100% of the bonds X in the structural units of formulae I and II are —SO$_2$— and up to 75% of the bonds X are —CO—. The aromatic rings in the structural units of formulae I and II are preferably unsubstituted or are substituted by one alkyl group. Most preferably, they are unsubstituted.

In the polyarylene ethers of this invention, the substituent A in the structural unit of formula II is preferably a group of formula IIIb, IIId or IIIe. Preferably A is a radical selected from

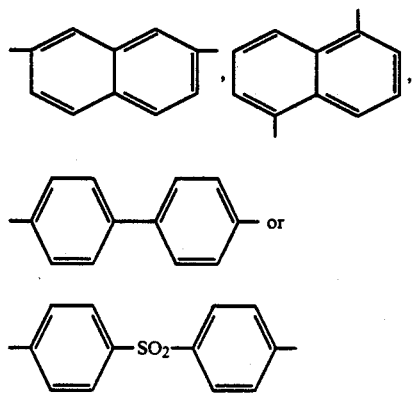

and, most preferably, is the radical

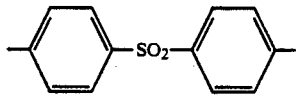

Y in these formulae is preferably —O—, C(CH$_3$)$_2$—, —S— or —SO$_2$—.

The most preferred polyarylene ether resins are those containing structural units of formula I and II wherein X is —SO$_2$— and A is the radical of formula IIIe, wherein Y is —SO$_2$—. Such polyaryl ethers have a high glass transition temperature.

The polyarylene ethers of this invention can be prepared, for example, by polycondensing a compound of formula IV or a mixture of different compounds of formula IV

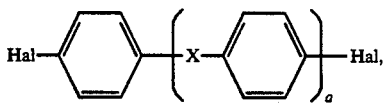 (IV)

wherein X and a are as defined above and Hal is halogen, preferably fluoro or chloro, in equimolar amounts with 2,2'-dihydroxybiphenyl or with a mixture of 2,2'-dihydroxybiphenyl and a phenol of formula

HO-A-OH (V), present therein in an amount of up to 98 mol %, wherein A is as defined above, in the presence of alkali and in a polar aprotic solvent, until the resultant polyarylene ether has a reduced viscosity of 0.1 to 2.0, measured in a 1% solution at 25° C. in N-methylpyrrolidone.

The preferred polyarylene ethers of this invention are prepared by polycondensing one or more dihalo compounds of formula IV with 2,2'-dihydroxybiphenyl or with a mixture of 2,2'-dihydroxybiphenyl and a phenol of formula IV which is contained therein in an amount of up to 95 mol %, preferably up to 90 mol %, until the polyarylene ether preferably has a reduced viscosity of 0.15 to 1.8 dl/g, most preferably of 0.2 to 1.2 dl/g.

In place of the 2,2'-dihydroxybiphenyl or of the diphenol of formula V it is also possible to use the corresponding alkali metal or alkaline earth metal phenolates, for example the potassium or calcium phenolates.

By equimolar amounts in connection with the above described process is meant a molar ratio of 0.8 to 1.2, preferably of 0.9 to 1.1 and, most preferably, of 0.95 to 1.05.

The alkali used in this process is ordinarily an alkali metal carbonate or alkaline earth metal carbonate such as sodium, potassium or calcium carbonate; but other alkali reagants such as sodium hydroxide, potassium hydroxide or calcium hydroxide may also be used.

Polar aprotic solvents which can be used in the process for the preparation of the polyether resins of this invention are, typically, dimethyl sulfoxide, dimethyl acetamide, diethyl acetamide, tetramethylurea, N-methylcaprolactam, N-methylpyrrolidone and, preferably, diphenyl sulfone.

The reaction is conveniently carried out at elevated temperature, preferably in the range up to the reflux temperature of the solvent, i.e. up to ca. 350° C.

The concurrent use of an entrainer such as chlorobenzene, xylene or toluene is often expedient in order to be able to remove the water of reaction from the reaction mixture as an azeotrope.

The compounds of formula IV are known and some are commercially available. Suitable compounds of formula IV are, for example, 4,4'-difluorobenzophenone, 1,3-bis(4-fluorobenzoyl)benzene, 1,3- or 1,4-bis(4-fluorophenylsulfonyl)benzene, 4,4'-dichlorobenzophenone, 4,4'-difluorodiphenylsulfone or 4,4'-dichlorodiphenylsulfone. Preferred compounds of formula IV are 4,4'-difluorobenzophenone, 4,4'-difluorodiphenylsulfone and, preferably 4,4'-dichlorodiphenylsulfone.

The compounds of formula V are likewise known compounds and most are commercially available. Illustrative examples of dihydric phenols of formula VI are hydroquinone, resorcinol, 4,4'-dihydroxydiphenyl, 2,5-dihydroxydiphenyl, 4,4'-dihydroxydiphenyl ether, 4,4'-dihydroxydiphenylsulfone, 4,4'-dihydroxy-3,3',5,5'-tetramethyldiphenylsulfone, 4,4'-dihydroxybenzophenone, 4,4'-dihydroxydiphenylmethane, 4,4'-dihydroxydiphenylthioether, 2,2-bis(4-hydroxyphenyl)-propane or dihydroxynaphthalene. Preferred compounds of formula V are 4,4'-dihydroxybiphenyl, 4,4'-dihydroxydiphenylsulfone, 1,5-dihydroxynaphthalene and 2,7-dihydroxynaphthalene.

The polyarylene ethers of this invention can be used in the conventional manner for thermoplastics and processed, for example, to mouldings or sheets, or they can be used as matrix resins, adhesives or coating compounds. Prior to the processing of the polyarylene ethers obtained in the form, for example, of moulding powders, melts or solutions, customary modifiers such as fillers, pigments, stabilisers or reinforcing agents such as carbon, boron or glass fibres, can be added. The polyarylene ethers of the invention can be processed together with other thermoset plastics. They are further suitable for use as modifiers for heat-curable resins such as epoxy resins or bismaleimides. Owing to their solubility in organic solvents, the polyarylene ethers of this invention are suitable preferably for making films from a solution or for incorporation in other systems, for example for modifying other plastics, thermoplastics as well as duromers, or as matrix resins for the production of fibrous composite systems, for which utility it is possible to use as reinforcing fibres the fibres conventionally used for reinforcing moulding materials. These fibres may be organic or inorganic fibres, natural fibres or synthetic fibres such as aramide fibres, and may be in the form of fibre bundles or continuous filaments. Illustrative of reinforcing fibres are glass, asbestos, boron, carbon and metal fibres.

Hence the present invention also relates to the mouldings, coatings or sheets as well as fibrous composite systems prepared by using the polyarylene ethers of this invention and containing, in addition to customary reinforcing fibres, the polyarylene ethers as matrix resins.

The polyarylene ethers of the invention have unexpectedly good solubility in methylene chloride and the stability of the solutions obtained is very good.

EXAMPLE 1

In a round flask fitted with stirrer and inert gas inlet, a mixture of 9.29 g (0.05 mol) of 2,2'-dihydroxybiphenyl, 33.34 g of diphenylsulfone, 7.85 g (0.0568 mol) of potassium carbonate and 55.00 g of xylene is heated at a bath temperature of 200° C. and a mixture of xylene/water is removed by distallation. Towards the end of the distillation, a vacuum (2 mbar) is briefly applied. Then 12.80 g (0.05 mol) of 4,4'-difluorodiphenylsulfone are added to the reaction mixture, the temperature is raised to 250° C. and kept for 1 hour. The temperature is thereafter raised to 320° C. and kept for 3 hours, whereupon the reaction mixture becomes increasingly viscous.

The reaction mixture is cooled and removed from the flask, pulverised and, after addition of 2N hydrochloric acid, extracted first with water and then with acetone. The purified polymer is then dried in a vacuum drier at a temperature up to 240° C. A polyarylene ether sulfone so obtained containing 2,2'-biphenyl units has a reduced viscosity (1% by weight of polymer in N-methylpyrrolidone (NMP) at 25° C.) of 0.63 dl/g. The solubility of the polymer in methylene chloride is more than 25%. The solution so obtained is stable for several weeks, i.e. neither turbidity nor a deposit or precipitation of the polymer occurs. The glass transition temperature ($T_G$) is indicated in the following table.

EXAMPLES 2–6

The Examples 2–6 indicated in the Table are carried out as described in Example 1, except that acetic acid is used in place of hydrochloric acid in Examples 4–6 and that in Example 6 the reaction mixture is not extracted, but dissolved in N-methylpyrrolidone. After filtration of the solution, the polymer is obtained by precipitation in isopropanol.

EXAMPLES 7–18

The Examples 7–18 indicated in the Table are carried out as described in Example 1, except that acetic acid is used in place of hydrochloric acid and that the reaction mixture is not extracted, but dissolved in methylene chloride. After filtration of the solution, the polymer is obtained by precipitation in isopropanol.

TABLE

Polyarylene ethers containing 2,2'-biphenylene units

| Example | Composition | Reactions Conditions | red. viscosity [dl/g]*) | Solubility in methylene chloride | $T_G$ (DSC) [°C.] |
|---|---|---|---|---|---|
| 1 | Polyether sulfone<br>2,2'-dihydroxybiphenyl (0.05 mol)<br>4,4'-difluorodiphenylsulfone (0.05 mol)<br>potassium carbonate (0.0568 mol) | 1 h/250° C.,<br>3 h/320° C. | 0.63 | >25% | 177 |
| 2 | Polyether sulfone copolymer<br>2,2'-dihydroxybiphenyl (0.0504 mol)<br>4,4'-dihydroxydiphenyl-<br>sulfone (0.0505 mol)<br>4,4'-dichlorodiphenylsulfone (0.1003 mol)<br>potassium carbonate (0.1162 mol) | 1 h/250° C.,<br>1 h/320° C.,<br>2 h/350° C. | 0.23 | >25% | 201 |
| 3 | Polyether sulfone polyether ketone copolymer<br>2,2'-dihydroxybiphenyl (0.10 mol)<br>4,4'-difluorobenzophenone (0.05 mol)<br>4,4'-difluorodiphenylsulfone (0.05 mol)<br>potassium carbonate (0.055 mol)<br>calcium carbonate (0.055 mol)**) | 1 h/250° C.,<br>1 h/320° C.,<br>4 h/350° C. | 0.21 | >25% | 143 |
| 4 | Polyether sulfone copolymer<br>2,2'-dihydroxybiphenyl (0.25 mol)<br>4,4'-dihydroxydiphenylsulfone (0.075 mol)<br>4,4'-dichlorodiphenylsulfone (0.1002 mol)<br>potassium carbonate (0.1128 mol) | 1 h/250° C.,<br>3 h/320° C. | 0.67 | >25% | 221 |
| 5 | Polyether sulfone copolymer<br>2,2'-dihydroxybiphenyl (0.0503 mol)<br>2,5-dihydroxydiphenyl (0.0501 mol)<br>4,4'-dichlorodiphenylsulfone (0.1003 mol)<br>potassium carbonate (0.1104 mol) | 1 h/250° C.,<br>3 h/320° C. | 0.92 | >25% | 189 |
| 6 | Polyether sulfone polyether ketone copolymer<br>2,2'-dihydroxybiphenyl (0.1003 mol)<br>4,4'-difluorobenzophenone (0.0503 mol)<br>4,4'-difluorodiphenylsulfone (0.0500 mol)<br>potassium carbonate (0.1103 mol) | 1 h/250° C.,<br>3 h/320° C.,<br>4 h/350° C. | 1.12 | >25% | 168 |
| 7 | Polyether sulfone<br>2,2'-dihydroxybiphenyl (0.4043 mol)<br>4,4'-dichlorodiphenylsulfone (0.4001 mol)<br>potassium carbonate (0.4223 mol) | 1 h/250° C.,<br>1 h/275° C.,<br>4 h/300° C. | 0.27 | >25% | 197 |

TABLE-continued

Polyarylene ethers containing 2,2'-biphenylene units

| Example | Composition | Reactions Conditions | red. viscosity [dl/g][*] | Solubility in methylene chloride | $T_G$ (DSC) [°C] |
|---|---|---|---|---|---|
| 8 | Polyether sulfone copolymer<br>2,2'-dihydroxybiphenyl (0.2008 mol)<br>4,4'-dihydroxybiphenyl (0.2008 mol)<br>4,4'-dichlorodiphenylsulfone (0.4001 mol)<br>potassium carbonate<br>(0.4206 mol) | 0,5 h/225° C.,<br>0,5 h/250° C.,<br>1 h/275° C.,<br>1 h/300° C.<br>3 h/320° C. | 0.39 | >25% | 195 |
| 9 | Polyether sulfone copolymer<br>2,2'-dihydroxybiphenyl (0.0402 mol)<br>4,4'-dihydroxydiphenyl-<br>sulfone (0.3608 mol)<br>4,4'-dichlorodiphenylsulfone (0.4000 mol)<br>potassium carbonate (0.4200 mol) | 1 h/250° C.,<br>4 h/280° C. | 0.56 | >25% | 223 |
| 10 | Polyether sulfone copolymer<br>2,2'-dihydroxybiphenyl<br>(0.10025 mol)<br>4,4'-dihydroxydiphenyl-<br>sulfone (0.10025 mol)<br>4,4'-dihydroxybiphenyl (0.2005 Mol)<br>4,4'-dichlorodiphenylsulfone (0.4000 mol)<br>potassium carbonate (0.4200 mol) | 1 h/250° C.,<br>4 h/280° C. | 0.53 | >25% | 208 |
| 11 | Polyether sulfone copolymer<br>2,2'-dihydroxybiphenyl (0.10025 mol)<br>4,4'-dihydroxydiphenyl-<br>sulfone (0.2005 mol)<br>4,4'-dihydroxybiphenyl (0,10025 mol)<br>4,4'-dichlorodiphenylsulfone (0.4000 mol)<br>potassium carbonate (0.4200 mol) | 1 h/250° C.,<br>4 h/280° C. | 0.82 | >25% | 214 |
| 12 | Polyether sulfone copolymer<br>2,2'-dihydroxybiphenyl (0.10025 mol)<br>1,5-dihydroxynaphthalene (0.10025 mol)<br>4,4'-dihydroxybiphenyl (0,2005 mol)<br>4,4'-dichlorodiphenylsulfone (0.4000 mol)<br>potassium carbonate (0.4200 mol) | 1 h/250° C.,<br>4 h/280° C. | 0.52 | >25% | 212 |
| 13 | Polyether sulfone copolymer<br>2,2'-dihydroxybiphenyl (0.10025 mol)<br>2,7-dihydroxynaphthalene (0.2005 mol)<br>4,4'-dihydroxybiphenyl (0,1025 mol)<br>4,4'-dichlorodiphenylsulfone (0.4000 mol)<br>potassium carbonate (0.4200 mol) | 1 h/250° C.,<br>4 h/280° C. | 0.52 | >25% | 204 |
| 14 | Polyether sulfone copolymer<br>2,2'-dihydroxybiphenyl (0.10025 mol)<br>2,7-dihydroxynaphthalene (0.2005 mol)<br>4,4'-dihydroxybiphenyl (0,1025 mol)<br>4,4'-dichlorodiphenylsulfone (0.4000 mol)<br>potassium carbonate (0.4200 mol) | 1 h/250° C.,<br>4 h/280° C. | 0.43 | >25% | 209 |
| 15 | Polyether sulfone polyether<br>ketone copolymer<br>2,2'-dihydroxybiphenyl (0.0502 mol)<br>4,4'-dihydroxydiphenyl-<br>sulfone (0.0504 mol)<br>4,4'-dichlorodiphenylsulfone (0,0503 mol)<br>4,4'-difluorobenzophenone (0.0502 mol)<br>potassium carbonate (0.4200 mol) | 1 h/250° C.,<br>4 h/320° C. | 0.34 | >25% | 188 |
| 16 | Polyether sulfone polyether<br>ketone copolymer<br>2,2'-dihydroxybiphenyl (0.0502 mol)<br>4,4'-dihydroxydiphenyl-<br>sulfone (0.0504 mol)<br>4,4'-dichlorodiphenylsulfone (0.0503 mol)<br>4,4'-difluorobenzophenone (0.0502 mol)<br>potassium carbonate (0.4200 mol) | 1 h/250° C.,<br>4 h/320° C. | 0.73 | >25% | 200 |
| 17 | Polyether sulfone copolymer<br>2,2'-dihydroxybiphenyl (0.0402 Mol)<br>hydroquinone (0.0402 mol)<br>4,4'-dihydroxybiphenyl-<br>sulfone (0.3208 mol)<br>4,4'-dichlorodiphenylsulfone (0.4000 mol)<br>potassium carbonate (0.4200 mol) | 1 h/250° C.,<br>1 h/275° C.,<br>3 h/280° C. | 0.82 | >25% | 224 |
| 18 | Polyethersulfon-Copolymer<br>2,2'-dihydroxybiphenyl (0.0201 mol)<br>4,4'-dihydroxydiphenyl-<br>sulfone (0,3812 mol)<br>4,4'-dichlorodiphenylsulfone (0.4000 mol)<br>potassium carbonate (0.4200 mol) | 1 h/250° C.,<br>1 h/275° C.,<br>3 h 45 min/280° C. | 0.85 | >25% | 228 |

[*]red. viscosity: 1% of polymer in NMP at 25° C.
[**]potassium/calcium carbonate mixtures as condensing agent in the preparation of aromatic polyethers are described in DE 3 342 433.

EXAMPLE 19

6.52 g (0.035 mol) of 2,2'-dihydroxybiphenyl, 78.84 g (0.315 mol) of 4,4'-dihydroxydiphenylsulfone, 99.50 g (0.347 mol) of 4,4'-dichlorodiphenylsulfone, 51.28 g (0.371 mol) of $K_2CO_3$ and 185 g diphenylsulfone are heated to 180° C., while blanketing with nitrogen, in a 1 litre metal reactor. After the temperature of the reaction mixture has reached 180° C., the batch is stirred for 2 hours. The water of condensation formed during the reaction is distilled continuously from the reaction mixture through a descending cooler. After 2 hours at 180° C., the reaction temperature is increased to 270° C. over the course of a further 2 hours and then maintained there for 2 hours. The reaction mixture is subsequently discharged from the reactor through a bottom blow valve and, after cooling, coarsely ground.

The ground reaction mixture is worked up by extraction (3 times with a 80:20 mixture of acetone/water and once with water). The end groups are set free by adding acetic acid during the extraction with water. The polyether sulfone copolymer is then dried at 110° C. under vacuum. It has a reduced viscosity of 0.57 dl/g, a $T_G$ (DSC) of 228° C. and an OH end group content of 72µ Val/g.

EXAMPLE 20

The polymers prepared according to Examples 4 and 8 are added to 20 parts by weight, as solution in methylene chloride, of a mixture consisting of 50 parts of N,N,N',N'-tetraglycidyldiaminodiphenylmethane and 50 parts of N,N,O-triglycidyl-p-aminophenol, and the solvent is removed under vacuum. After addition of 50 parts of p-diaminodiphenylsulfone, the mixture is cured in a mould for 2 hours at 160° C. and for 2 hours at 210° C. Test samples are cut from a sheet so prepared and the fracture toughness according to ASTM E 399 is determined. Very good fracture toughness values are obtained.

TABLE
Fracture toughness of epoxy resins modified with thermoplastics

| Addition of thermoplastic of Example | Fracture toughness (J/m²) |
|---|---|
| 4 | 248 |
| 8 | 227 |
| 10 | 250 |

EXAMPLE 21

Following the procedure of Example 19, a polyether sulfone is synthesised from 0.053 mol of 2,2'-dihydroxybiphenyl, 0.298 mol of 4,4'-dihydroxydiphenylsulfone and 0.347 mol of 4,4'-dichlorodiphenylsulfone with 0.371 mol of potassium carbonate over 1.5 hours at 270° C. The polymer has reduced viscosity (1% by weight of polymer in NMP at 25° C.) of 0.54 dl/g, a glass transition temperature (DSC) of 221° C., and an OH end group content of 76µ Val/g.

EXAMPLE 22

Following the procedure of Example 20, test specimens are prepared from the epoxy resin mixture and the polyether sulfone synthesised in Example 21 as thermoplastic modifier in the amounts indicated in the Table. The flexural strength according to ISO 178, fibre elongation according to ISO 178, and fracture toughness $C_{Ic}$ according to ASTM E 399 are determined. The values obtained are reported in the table.

| Thermoplastic modifier (parts) | Example 22 | | |
|---|---|---|---|
| | flexural strength [N/mm²] | edge fibre elongation [%] | fracture toughness $G_{Ic}$ [J/m²] |
| 20 | 161 | 5.6 | 242 |
| 30 | 170 | 6.4 | 298 |
| 40 | 176 | 7.1 | 400 |

What is claimed is:

1. A polyarylene ether having a reduced viscosity of 0.1 to 2.0 dl/g, measured at 25° C. in a 1% solution by weight in N-methylpyrrolidone, which ether, based on the total amount of the structural units present in the polyether resin, contains 2–100 mol % of a recurring structural unit of formula I

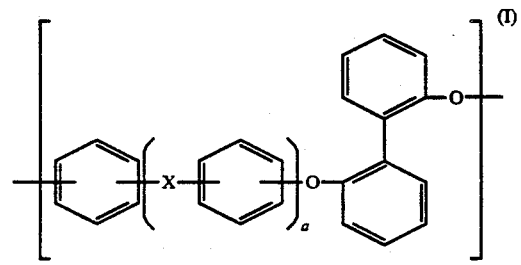

and 0–98 mol % of a recurring structural unit of formula II

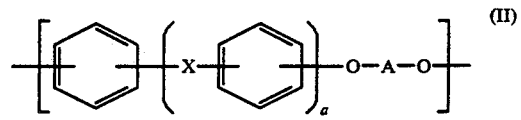

wherein each a is 1 or 2, 10 to 100% of X, based on the total number of the bonds X present in the structural units of formulae I and II, are —SO₂—, and 0 to 90% of X are —CO—, and A is a group of formula IIIa–IIIg

(IIIa)

(IIIb)

(IIIc)

(IIId)

(IIIe)

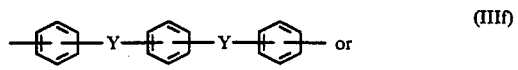

(IIIf) or

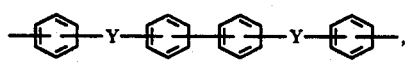
(IIIg)

wherein Y is —CH$_2$—, —C(CH$_3$)$_2$—, —C(CF$_3$)$_2$—, —S—, —SO—, —SO$_2$—, —O— oder —CO—, and the aromatic rings in the structural units of formulae I and II are unsubstituted or substituted by one or more alkyl groups of 1 to 4 carbon atoms.

2. A polyarylene ether according to claim 1, which contains 5–100 mol % of a recurring structural unit of formula I and 95–0 mol % of a recurring structural unit of formula II.

3. A polyarylene ether according to claim 1, which contains 10–100 mol % of a recurring structural unit of formula I and 90–0 mol % of a recurring structural unit of formula II.

4. A polyarylene ether according to claim 1, wherein 25 to 100% of the bonds X are —SO$_2$— and 0 to 75 of the bonds X are —CO—.

5. A polyarylene ether according to claim 1, wherein A is a group of formula IIIb, IIId or IIIe.

6. A polyarylene ether according to claim 1, wherein A is a group of formula IIIb, IIId or IIIe, wherein Y is —CO—, —O—, —C(CH$_3$)$_2$—, —S— or —SO$_2$—.

7. A polyarylene ether according to claim 1, wherein A is a radical

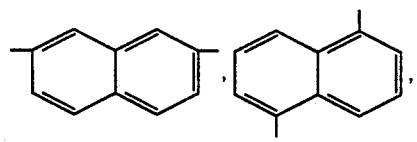

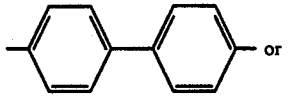
or
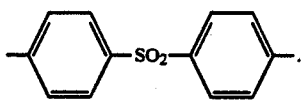

8. A polyarylene ether according to claim 1, wherein X is —SO$_2$— and A is the radical of formula IIIe, wherein Y is —SO$_2$—.

9. A process for the preparation of a polyarylene ether according to claim, 1, which comprises polycondensing a compound of formula IV or a mixture of different compounds of formula IV

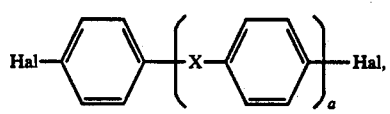
(IV)

wherein X and a are as defined above and Hal is halogen, preferably fluoro or chloro, in equimolar amounts with 2,2'-dihydroxybiphenyl or with a mixture of 2,2'-dihydroxybiphenyl and a phenol of formula

HO—A—OH        (V), present therein in an amount of up to 98 mol %, wherein A has the same meaning as in claim 1, in the presence of alkali and in a polar aprotic solvent, until the resultant polyarylene ether has a reduced viscosity of 0.1 to 2.0, measured at 25° C. in a 1% solution of N-methylpyrrolidone.

10. A fibrous composite structure containing reinforcing fibres and, as matrix resin, a polyarylene ether according to claim 1.

* * * * *